United States Patent
John et al.

(10) Patent No.: US 10,619,594 B2
(45) Date of Patent: Apr. 14, 2020

(54) COMBUSTION SYSTEM FOR AN INTERNAL COMBUSTION ENGINE

(71) Applicant: Caterpillar Inc., Peoria, IL (US)

(72) Inventors: Bobby John, Peoria, IL (US);
Jonathan W Anders, Peoria, IL (US);
David Todd Montgomery, Edelstein, IL (US); Kenth I Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 235 days.

(21) Appl. No.: 15/475,848

(22) Filed: Mar. 31, 2017

(65) Prior Publication Data
US 2018/0283315 A1 Oct. 4, 2018

(51) Int. Cl.
*F02F 3/28* (2006.01)
*F02M 61/14* (2006.01)
(Continued)

(52) U.S. Cl.
CPC ............ *F02F 3/28* (2013.01); *F02B 23/0651* (2013.01); *F02B 23/0669* (2013.01);
(Continued)

(58) Field of Classification Search
CPC .......... F02F 3/28; F02D 41/403; F02D 41/40; F02D 41/402; F02D 41/405;
(Continued)

(56) References Cited

U.S. PATENT DOCUMENTS

| 4,616,612 A | 10/1986 | Jane |
| 7,040,279 B2 | 5/2006 | Regueiro |

(Continued)

FOREIGN PATENT DOCUMENTS

| DE | 102005049443 | 4/2007 |
| DE | 102013022040 | 6/2015 |

(Continued)

OTHER PUBLICATIONS

EP-2696051-A1 (English Translation) (Year: 2012).*
(Continued)

*Primary Examiner* — Joseph J Dallo
*Assistant Examiner* — Scott A Reinbold
(74) *Attorney, Agent, or Firm* — Hibshman Claim Construction PLLC

(57) ABSTRACT

A combustion system for an internal combustion engine includes a cylinder having a cylinder wall defining a bore, a piston disposed inside the bore, a combustion chamber delimited by a cylinder head, the cylinder wall, and the piston. The piston includes a piston bowl defining a floor portion, and at least one scooped recess extending radially outwardly from a periphery of the piston bowl. The internal combustion engine further includes a fuel injector configured to inject fuel into the combustion chamber as a plurality of fuel jets at a main injection timing such that each fuel jet contacts the floor portion of the piston bowl and follows a profile of the piston bowl and enter the at least one scooped recess. Furthermore, at least one of the plurality of is deflected by the at least one scooped recess away from the cylinder wall.

20 Claims, 7 Drawing Sheets

(51) Int. Cl.
*F02D 41/40* (2006.01)
*F02B 23/06* (2006.01)
*F02M 61/18* (2006.01)

(52) U.S. Cl.
CPC ...... *F02B 23/0693* (2013.01); *F02B 23/0696* (2013.01); *F02D 41/402* (2013.01); *F02D 41/403* (2013.01); *F02M 61/14* (2013.01); *F02M 61/1806* (2013.01)

(58) Field of Classification Search
CPC . F02D 2041/389; F02D 41/401; F02M 61/14; F02M 61/1806; F02M 69/045; F02B 23/0651; F02B 23/0669; F02B 23/0672; F02B 2275/14; F02B 2023/103; F02B 23/101; F02B 17/005; F02B 23/0693; F02B 23/0627; F02B 23/0678
USPC .......................................................... 123/299
See application file for complete search history.

(56) References Cited

U.S. PATENT DOCUMENTS

| | | | |
|---|---|---|---|
| 7,942,126 B2 | 5/2011 | Zöller | |
| 9,476,381 B2 | 10/2016 | Böwing et al. | |
| 2005/0027431 A1 | 2/2005 | Todoroki et al. | |
| 2005/0028788 A1 | 2/2005 | Shafter et al. | |
| 2005/0115537 A1* | 6/2005 | Liu | F02B 23/0672 123/276 |
| 2005/0115538 A1* | 6/2005 | Ono | F02B 23/0693 123/276 |
| 2006/0042586 A1* | 3/2006 | Hutmacher | F02B 23/0651 123/276 |
| 2014/0305402 A1* | 10/2014 | Zoeller | F02B 23/0651 123/294 |
| 2015/0308371 A1* | 10/2015 | Eismark | F02B 23/0627 123/193.6 |
| 2015/0354439 A1* | 12/2015 | Shimo | F02F 7/0002 123/659 |
| 2017/0159549 A1* | 6/2017 | Uehara | F02B 23/06 |
| 2017/0198632 A1 | 7/2017 | Klyza et al. | |
| 2017/0276108 A1 | 9/2017 | Takase | |
| 2019/0024604 A1 | 1/2019 | Kurtz et al. | |

FOREIGN PATENT DOCUMENTS

| | | | |
|---|---|---|---|
| DE | 102014002625 | 8/2015 | |
| DE | 102014005138 | 10/2015 | |
| EP | 2696051 A1 * | 2/2014 | ......... F02B 23/0669 |
| JP | 2010112350 | 5/2010 | |
| JP | 2012189041 | 10/2012 | |
| JP | 2014238011 | 12/2014 | |

OTHER PUBLICATIONS

Mingfa Yao et al., Experimental study of n-butanol additive and multi-injection on HD diesel engine performance and emissions, Fuel, vol. 89, Issue 9, Sep. 2010, pp. 2191-2201.

* cited by examiner

COMBUSTION SYSTEM FOR AN INTERNAL COMBUSTION ENGINE

TECHNICAL FIELD

The present disclosure relates generally to combustion systems for internal combustion engines. More particularly, the disclosure relates to the combustion system including a piston having a piston bowl and a scooped recess along a periphery of the piston bowl.

BACKGROUND

Modern combustion engines may include one or more cylinders as part of the engine. The cylinder head and an associated piston may define a combustion chamber therebetween. Fuel for combustion is directly injected into the combustion chamber by, for example, a fuel injector which is associated with the cylinder, the fuel injector having at least one orifice disposed such that it can directly inject fuel into the combustion chamber.

Different mixtures and/or equivalence ratios of the fuel/air mixture may produce different results during combustion. A manner in which the injected fuel mixes and/or interacts with air and other environmental elements of the combustion chamber may impact the combustion process and associated emissions. Further, if the fuel and air mixing is inadequate, then suboptimal or abnormally large amounts of soot may form within the combustion chamber.

U.S. Pat. No. 7,942,126 discloses a method for operating an internal combustion engine having a piston with a piston recess which includes a transitional region with an annular stepped space. The patent discloses directing fuel jets, injected by the fuel injector, towards the annular stepped space. The fuel jet is deflected by the annular stepped recess such that a first portion of the fuel jet is deflected towards the piston recess, a second portion of the fuel jet is deflected into a combustion space and towards a wall of a cylinder, and a third portion of the fuel jet is deflected in a circumferential direction.

SUMMARY OF THE INVENTION

According to an aspect of the disclosure a combustion system for an internal combustion engine is disclosed. The combustion system includes a cylinder having a cylinder wall defining a bore, a piston disposed inside the bore, a combustion chamber, and a fuel injector. The piston is configured to reciprocate between a top dead center and a bottom dead center. The piston includes a piston bowl and at least one scooped recess extending radially outwardly from a periphery of the piston bowl. The piston bowl defines a floor portion. The combustion chamber is delimited by a cylinder head, the cylinder wall, and the piston. Also, the fuel injector is configured to inject fuel into the combustion chamber as a plurality of fuel jets. The plurality of fuel jets is injected at a main injection timing such that each fuel jet contacts the floor portion of the piston bowl and follows a profile of the piston bowl and subsequently enters the at least one scooped recess. Furthermore, at least one of the plurality of fuel jets is deflected, by the at least one scooped recess, away from the cylinder wall.

According to another aspect of the disclosure a combustion system for an internal combustion engine is disclosed. The combustion system includes a cylinder having a cylinder wall defining a bore, a piston disposed inside the bore, a combustion chamber, and a fuel injector. The piston is configured to reciprocate between a top dead center and a bottom dead center. The piston includes a piston bowl and at least one scooped recess extending radially outwardly from a periphery of the piston bowl. The piston bowl defines a floor portion. Further, the combustion chamber is delimited by a cylinder head, the cylinder wall, and the piston. Also, the fuel injector is configured to inject fuel into the combustion chamber as a plurality of main fuel jets and a plurality of pilot fuel jets. The plurality of pilot fuel jets is injected at a pilot injection timing such that the at least one of the plurality of pilot fuel jets is directed towards the at least one scooped recess, and contacts the at least one scooped recess. Further, the plurality of main fuel jets is injected at a main injection timing such that each main fuel jet contacts the floor portion of the piston bowl and follows a profile of the piston bowl and subsequently enters the at least one scooped recess. Furthermore, at least one of the plurality of main fuel jets is deflected, by the at least one scooped recess, away from the cylinder wall.

According to yet another aspect of the disclosure a method for operating a combustion system for an internal combustion engine is disclosed. The method includes moving a piston between a top dead center and a bottom dead center of a cylinder. The piston includes a piston bowl and at least one scooped recess extending radially outwardly from a periphery of the piston bowl. The piston bowl defines a floor portion. The method also includes injecting fuel, by a fuel injector, into a combustion chamber as a plurality of pilot fuel jets at a pilot injection timing such that the at least one of the plurality of pilot fuel jets is directed towards the at least one scooped recess, and contacts the at least one scooped recess. The pilot injection timing corresponds to a position of the piston between 60 degrees before the top dead center and 35 degrees before the top dead center. The method further includes injecting fuel, by the fuel injector, into the combustion chamber as a plurality of main fuel jets at a main injection timing such that each main fuel jet contacts the floor portion of the piston bowl and follows a profile of the piston bowl and subsequently enters the at least one scooped recess. Furthermore, at least one of the plurality of main fuel jets is deflected, by the at least one scooped recess, away from a cylinder wall. The main injection timing corresponds to a position of the piston between 15 degrees before the top dead center and 5 degrees after the top dead center.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Figure 1:
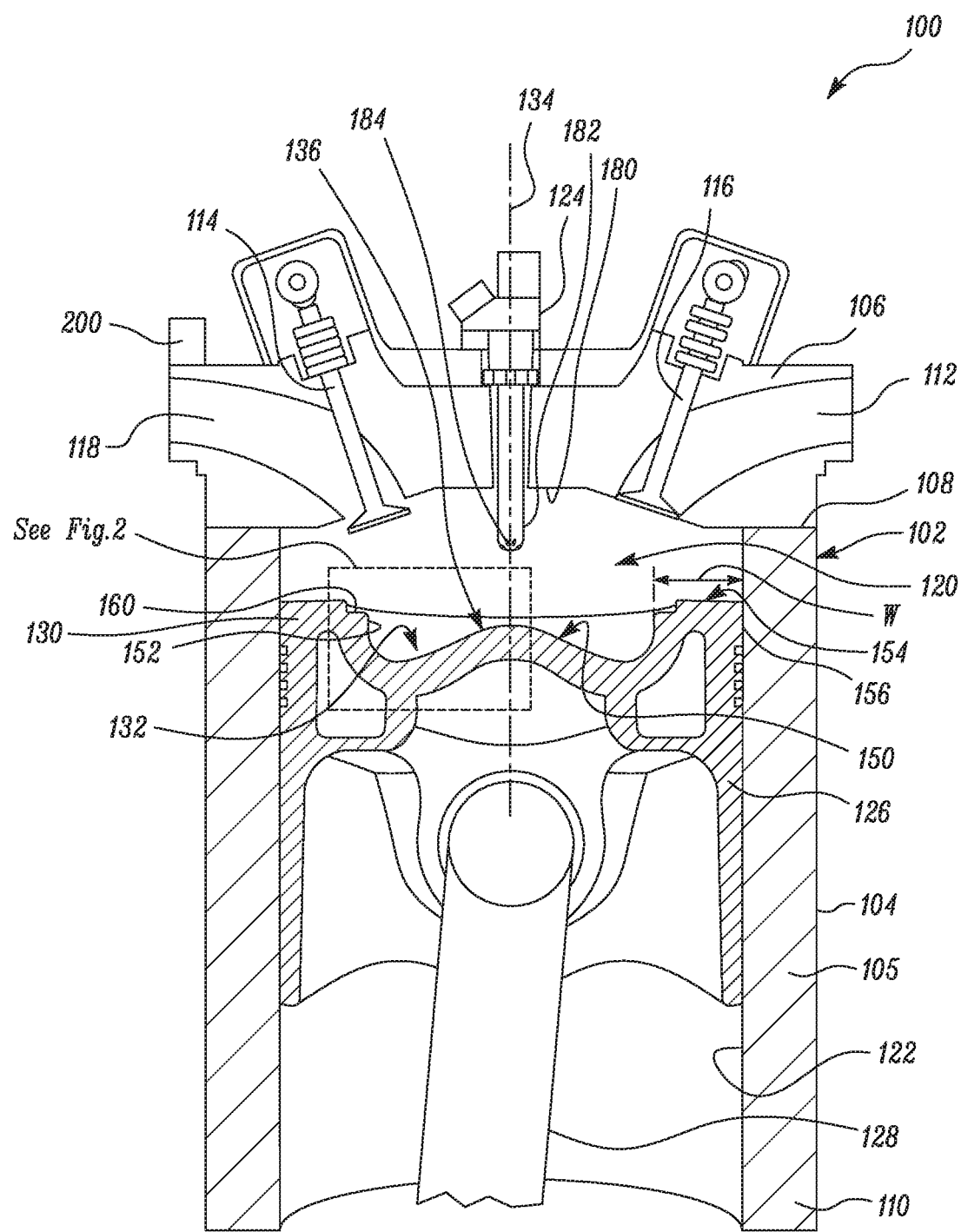
FIG. 1 illustrates a sectional view of an internal combustion engine including a combustion system, in accordance with an embodiment of the disclosure.

Referring to FIG. 1, one exemplary embodiment of an internal combustion engine 100 is disclosed. The internal combustion engine 100 is a reciprocating engine and may include a diesel engine, a gasoline engine, a gas engine, a two stroke engine, a four stroke engine, or any other similar internal combustion engine known in the art. The internal combustion engine 100 includes a combustion system 102 having a cylinder 104, a cylinder head 106 coupled to a first end 108 of the cylinder 104. A crankcase (not shown) may be coupled to a second end 110 of the cylinder 104. The cylinder head 106 may act as a support structure for mounting various other components of the internal combustion engine 100 such as an intake valve 114, an exhaust valve 116, etc. The cylinder head 106 may include various features such as an intake conduit 118 for allowing intake of air into a combustion chamber 120 and an exhaust conduit 112 for facilitating discharge of exhaust gases from the combustion chamber 120.

The cylinder 104 includes a cylinder wall 105 that defines a bore 122 extending from a first end 108 of the cylinder 104 to a second end 110 of the cylinder 104. Although the depictions from FIG. 1 through FIG. 6 depict a single cylinder configuration, it may be noted that the aspects of the present disclosure are applicable to internal combustion engines having multiple cylinders. The combustion system 102 further includes a fuel injector 124, the combustion chamber 120, and a piston 126 that is moveably disposed within the bore 122.

The piston 126 is configured to reciprocate within the bore 122 between a top dead center (TDC) of the cylinder 104 and a bottom dead center (BDC) of the cylinder 104, during engine operation. The piston 126 may be pivotably coupled to a connecting rod 128 that enables a rotation of a crankshaft (not shown), assembled within the crankcase, as the piston 126 slides (or reciprocates within the bore 122). The piston 126 includes a piston head 130 that may receive and/or be exposed to combustion gases generated within the combustion chamber 120. The combustion gases may exert pressure on the piston head 130 and may push the piston 126 towards the second end 110 of the cylinder 104, during an expansion or a power stroke of the internal combustion engine 100.

Figure 2:
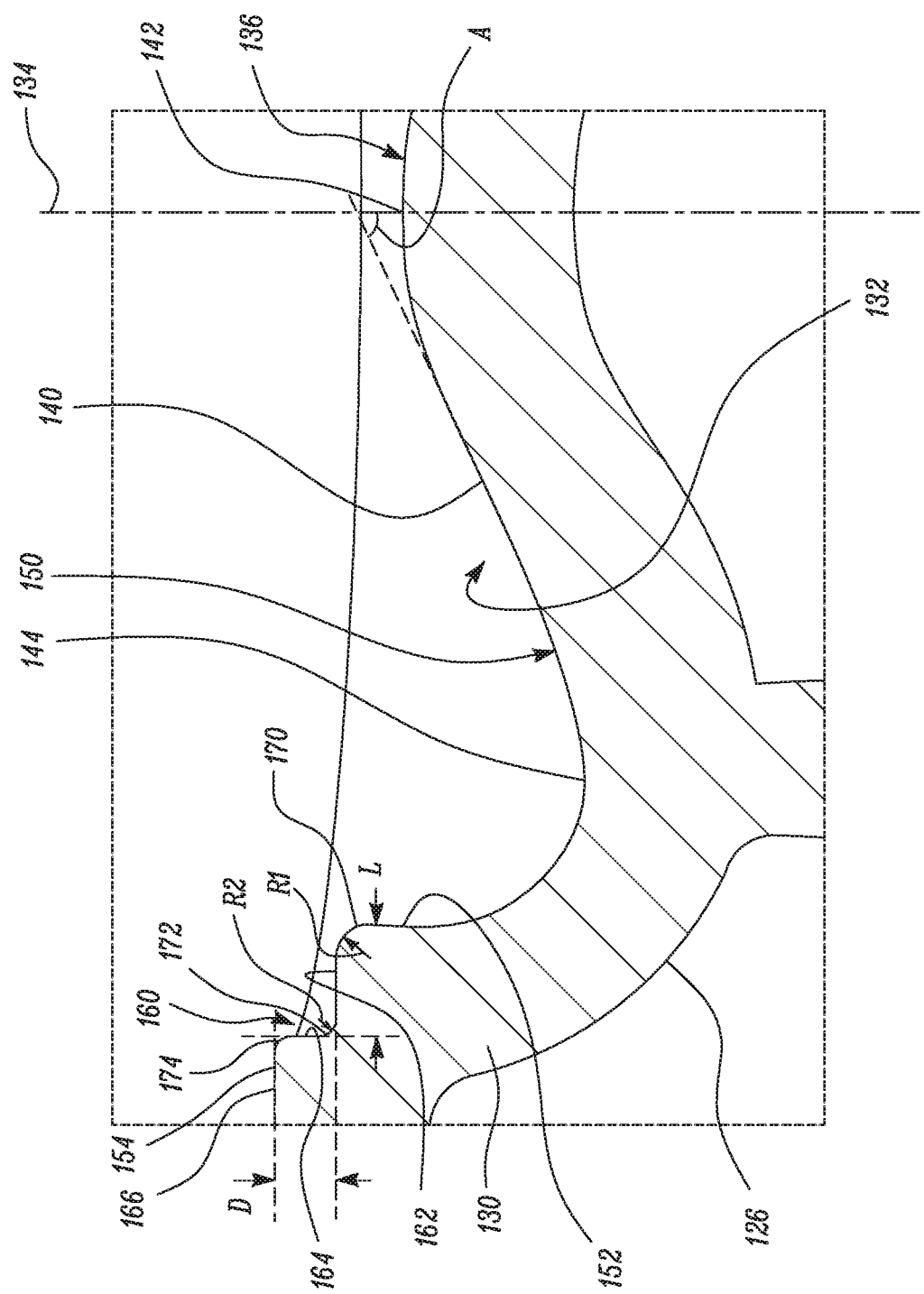
FIG. 2 illustrates an enlarged sectional view of a piston bowl and a scooped recess of a piston of the combustion system, in accordance with an embodiment of the disclosure.

Referring to FIGS. 1 and 2, the piston 126 may include a piston bowl 132 defined in the piston head 130. As shown in FIG. 1, the piston bowl 132 is an upward-facing cavity formed within the piston head 130. Both the piston head 130 and the piston bowl 132 include a circular shape and are symmetrical about a central axis 134 of the piston 126. The piston bowl 132 may include a dome 136 disposed concentrically about the central axis 134 and forms a central portion of the piston bowl 132. The dome 136 is a protrusion, and includes a surface 140 angled downwardly relative to the central axis 134 from an apex 142 of the dome 136. The surface 140 slopes downward away from the central axis 134 and has a generally tangential transition to a base 144. The base 144 may include a generally concave toroidal shape and surrounds the dome 136, curving with a constant base radius away from the central axis 134 of the piston 126. The base 144 and the surface 140 together define a floor portion 150 of the piston bowl 132. The floor portion 150 may include a floor angle 'A' relative to the central axis 134 of the piston 126. The floor angle 'A' is defined as an angle of the surface 140 relative to the central axis 134 of the piston 126. In certain implementations, the floor angle 'A' may be in a range of 62.5 degrees to 72.5 degrees. In other implementations, the floor angle 'A' may be in a range of 55 degrees to 80 degrees.

The piston bowl 132 further includes a rim portion 152 extending away from the floor portion 150. The rim portion 152 includes a generally tangential transition to an outer edge of the base 144. The rim portion 152 generally extends upward, away from the base 144, and surrounds the dome 136 and the base 144. The apex 142, surface 140, base 144, and rim portion 152 have generally smooth, tangential transitions from one surface to the next, forming a smooth surface of the piston bowl 132.

Further, the piston 126 includes at least one scooped recess 160 defined in the piston head 130. As shown in FIGS. 1 and 2, the scooped recess 160 is an upward facing cavity that extends along a periphery of the piston bowl 132. The scooped recess 160 also extends in a radial direction from the periphery of the piston bowl 132. In certain implementations, the piston 126 includes a single scooped recess 160, which extends along a full circumference of the piston bowl 132 (shown in FIGS. 1-5). In certain other implementations, the scooped recess 160 may extend along a part of the circumference of the piston bowl 132 (shown in FIG. 6) such that the scooped recess 160 may form an arc that subtends an angle to the central axis 134. In such a case, the angle may be less than 360 degrees (shown in FIG. 6). Although, only one such scooped recess 160 is shown, it may be appreciated that there may be more than one scooped recess, each disposed along the periphery of the piston bowl 132.

Further, the piston 126 may include a crown portion 154 extending from an edge of the rim portion 152 to an outer surface 156 of the piston 126. The crown portion 154 includes a width 'W' defined in a radial direction relative to the central axis 134. In an embodiment, the crown portion 154 includes the scooped recess 160 and a top surface 166 of the piston head 130. In certain implementations, the width 'W' of the crown portion 154 may be in a range of 5% to 25% of a diameter of the bore 122. In some other implementations, the width 'W' may be about 14% of the diameter of the bore 122. In other embodiments, the width 'W' may be in range of 10 mm to 50 mm.

The scooped recess 160 may include a bottom portion 162 and a sidewall portion 164. The bottom portion 162 extends radially outwardly from the rim portion 152, and forms a floor of the scooped recess 160. In an embodiment, the bottom portion 162 may be substantially perpendicular to the rim portion 152, and may be substantially parallel to the top surface 166 of the piston head 130. The bottom portion 162 includes a length 'L' in a radial direction relative to the central axis 134. In certain implementations, the length 'L' may be 7% of the diameter of the bore 122 of the cylinder 104. In other implementations, the length 'L' may be in a range of 6% to 8% of the diameter of the bore 122 of the cylinder 104. In some embodiments, the length 'L' may be in a range of 25% to 75% of the width 'W' of the crown portion 154 of the piston 126. In another embodiment, the length 'L' may be about 50% of the width 'W' of the crown portion 154 of the piston 126.

The sidewall portion 164 of the scooped recess 160 extends substantially upwardly, away from the bottom portion 162, and forms a wall of the scooped recess 160. In an implementation, the sidewall portion 164 may be substantially perpendicular to the bottom portion 162 and the top surface 166 of the piston head 130. The sidewall portion 164 includes a depth 'D' in an axial direction of the piston 126, parallel to the central axis 134, and defines a depth of the scooped recess 160 relative to the top surface 166 of the piston head 130. In certain implementations, the depth 'D' may be 2% of the diameter of the bore 122 of the cylinder 104. In other implementations, the depth 'D' may be in a range of 1% to 3% of the diameter of the bore 122 of the cylinder 104. In some other implementations, the depth 'D' may be greater than and equal to 3 millimeters.

Further, the scooped recess 160 defines a first filleted edge 170 with the rim portion 152 of the piston bowl 132. The first filleted edge 170 is of a convex shape curving with a substantially constant radius 'R1', and is disposed between the bottom portion 162 and the rim portion 152. In an embodiment, the radius 'R1' may be 3% of the diameter of the bore 122 of the cylinder 104. In other embodiments, the radius 'R1' may be in a range of 2% to 4% of the diameter of the bore 122 of the cylinder 104. In certain other implementations, the radius 'R1' may be at least 2 millimeters. In another embodiment, the radius 'R1' may be in a range of 10% to 30% of the width 'W' of the crown portion 154 of the piston 126. In other embodiments, the radius 'R1' may be about 20% of the width 'W' of the crown portion 154. In certain implementations, the first filleted edge 170 may include a generally tangential transition to both the rim portion 152 and the bottom portion 162.

The scooped recess 160 may also include a second filleted edge 172 defined between the bottom portion 162 and the sidewall portion 164. The second filleted edge 172 is of a concave shape, curving with a substantially constant radius 'R2'. In an embodiment, the radius 'R2' may be 1% of the diameter of the bore 122 of the cylinder 104. In other embodiments, the radius 'R2' may be in a range of 1% to 3% of the diameter of the bore 122 of the cylinder 104. In some embodiments, the radius 'R2' is greater than 1 millimeter. In some other embodiments, the radius 'R2' may be in a range of 50% to 70% of the depth 'D' of the sidewall portion 164. In some other implementations, the radius 'R2' may be about 60% of the depth 'D' of the sidewall portion 164. In certain implementations, the second filleted edge 172 may include a generally tangential transition to both the sidewall portion 164 and the bottom portion 162. The scooped recess 160 may also define a third filleted edge 174 with the top surface 166 of the piston head 130. The third filleted edge 174 may be of a convex shape, curving with a substantially constant radius. The third filleted edge 174 may include a constant radius 'R3'. In certain implementations, the radius 'R3' may be in a range of 0.25 millimeters to 0.75 millimeters. In some embodiments, the radius 'R3' may be 0.5 millimeters. Further, in some embodiments, the radius 'R2' of the second filleted edge 172 is less than a value determined by subtracting a value of radius 'R3' from a value of depth 'D' of the sidewall portion 164. The top surface 166 of the piston head 130 may extend substantially outwardly from the scooped recess 160 in a direction radial to the central axis 134. Therefore, the top surface 166 of the piston head 130 is substantially perpendicular to the sidewall portion 164.

Again referring to FIG. 1, the combustion system 102 includes the fuel injector 124 to inject fuel into the combustion chamber 120 as fuel jets. The combustion chamber 120 is defined as an enclosure between a flame deck surface 180 of the cylinder head 106, the piston 126, and the cylinder wall 105 of the cylinder 104. Therefore, the combustion chamber 120 is delimited by the cylinder head 106, the cylinder wall 105, and the piston 126. The fuel injector 124 may be mounted in the cylinder head 106, and includes a tip 182 that protrudes within the combustion chamber 120 through the flame deck surface 180 of the cylinder head 106. The fuel injector 124 includes a plurality of orifices 184 formed at the tip 182 to directly inject fuel into the combustion chamber 120 as, for example, a plurality of fuel jets.

In an implementation, the fuel injector 124 is configured to inject a plurality of main fuel jets 190, also referred as a plurality of fuel jets, at a main injection timing, and may be referred as a main fuel injection event. The main injection timing may correspond to a starting of injection of the plurality of main fuel jets 190. The main fuel injection event refers to an injection of the fuel when the piston 126 is at or close to a maximum compression distance or the TDC position during a compression stroke of the piston 126. In certain other implementations, the fuel injector 124 is also configured to inject fuel into the combustion chamber 120 as a plurality of pilot fuel jets 192 at a pilot injection timing, and may be referred as a pilot fuel injection event. The pilot injection timing may correspond a starting of injection of the plurality of pilot fuel jets 192. The pilot fuel injection event refers to an injection of the fuel when the piston 126 is below the maximum compression distance or the TDC position during the compression stroke of the piston 126. It may be appreciated that the pilot fuel injection event occurs before the main fuel injection event during an engine cycle.

The combustion system 102 may further include a controller 200 to control an actuation of the fuel injector 124 to control a main injection timing and/or the pilot injection timing. The controller 200 may be an engine control module (ECM of the internal combustion engine 100. Alternatively, the controller 200 may be a separate control unit configured to control actuation of the fuel injector 124. The controller 200 may monitor various parameters such as a spray angle of the fuel jets, an engine speed, engine power, a load on the internal combustion engine 100, a crank angle of the crankshaft, etc., to determine a suitable main injection timing and/or the pilot injection timing, respectively, for injection of the plurality of main fuel jets 190 and/or the plurality of pilot fuel jets 192.

Figure 3:
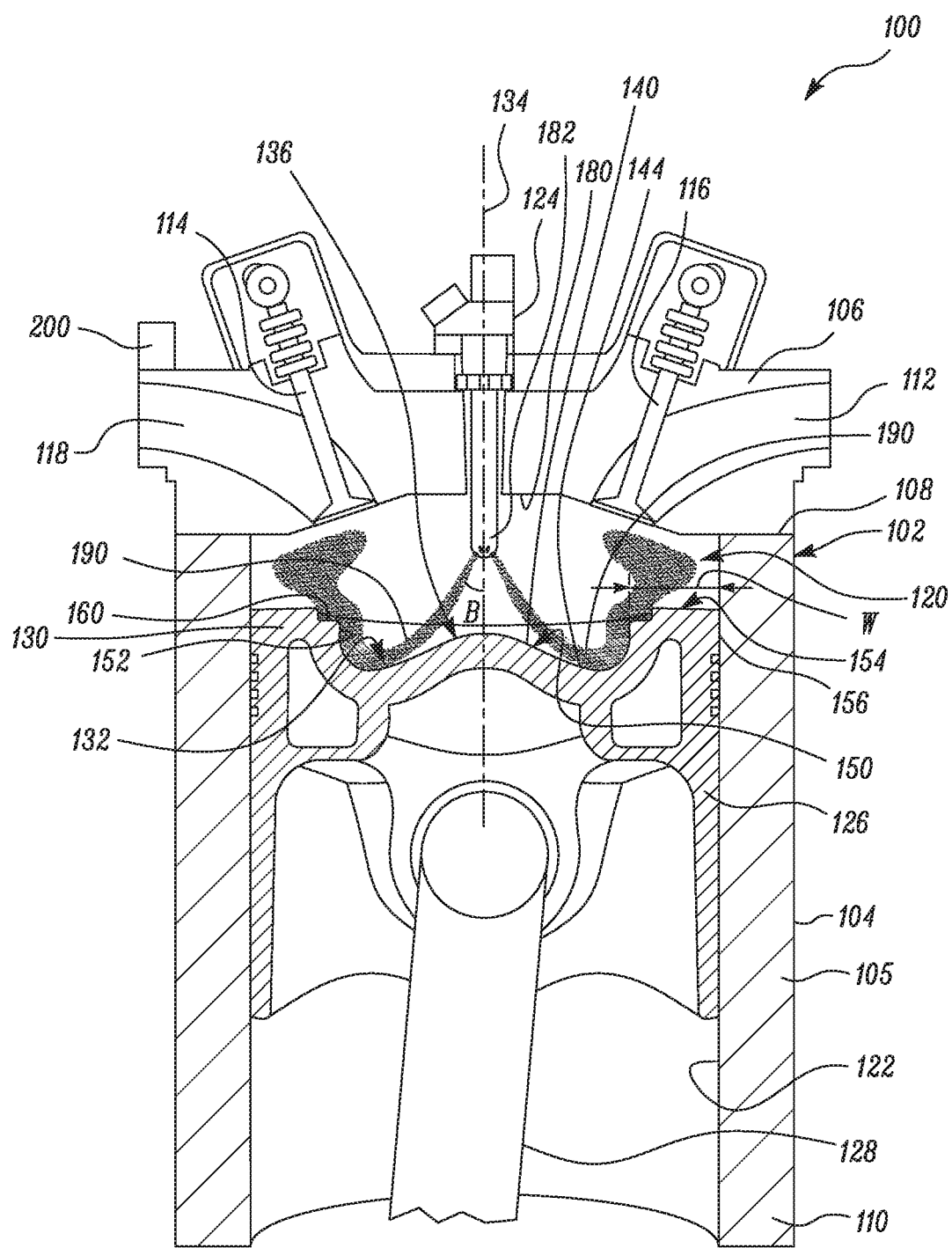
FIG. 3 illustrates a sectional view of the internal combustion engine depicting a path of plurality of main fuel jets along a profile of the piston bowl and a profile of the scooped recess, in accordance with an embodiment of the disclosure.

The controller 200 may control an actuation of the fuel injector 124 to inject the plurality of main fuel jets 190 at the main injection timing such that each main fuel jet contacts the floor portion 150 of the piston bowl 132 and follows profile of the piston bowl 132. As shown in FIG. 3, at least one of the plurality of main fuel jets 190, upon contacting the floor portion 150, is deflected to follow a profile of the piston bowl 132 and subsequently enters the scooped recess 160. In an embodiment, the at least one of the plurality of main fuel jets 190, upon entering the scooped recess 160, follows a profile of the scooped recess 160. The scooped recess 160 deflects at least one of the plurality of main fuel jets 190 away from the cylinder wall 105. In an implementation, the scooped recess 160 deflects the at least one of plurality if main fuel jets 190 towards the flame deck surface 180 of the cylinder head 106. In certain implementations, the main injection timing corresponds to a position of the piston 126 between 15 degrees before the top dead center and 5 degrees after the top dead center, during the compression stroke the internal combustion engine 100.

Figure 4:
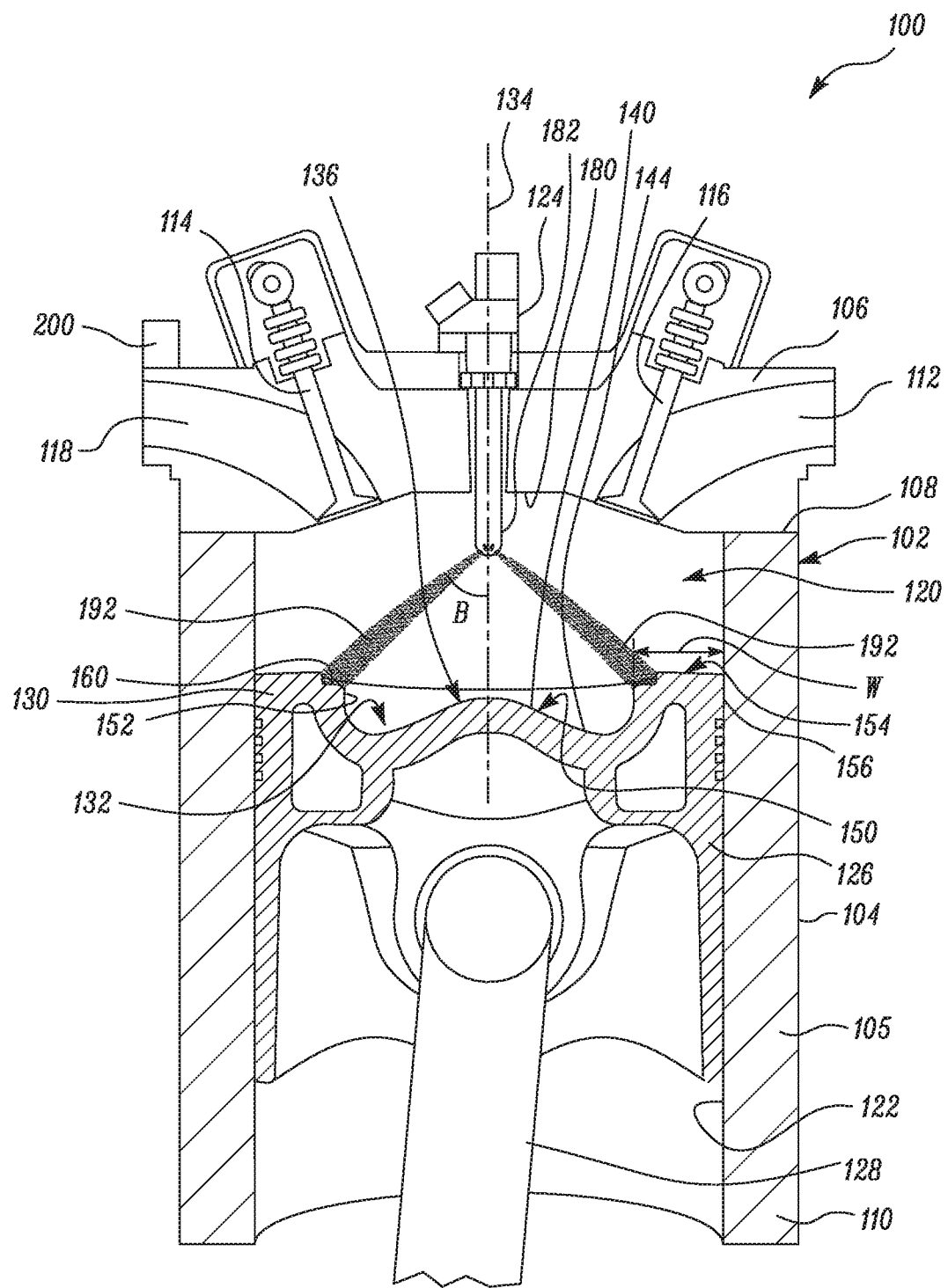
FIG. 4 illustrates a sectional view of the internal combustion engine depicting a plurality of pilot fuel jets directed towards and contacting the scooped recess, in accordance with an embodiment of the disclosure.
Figure 5:
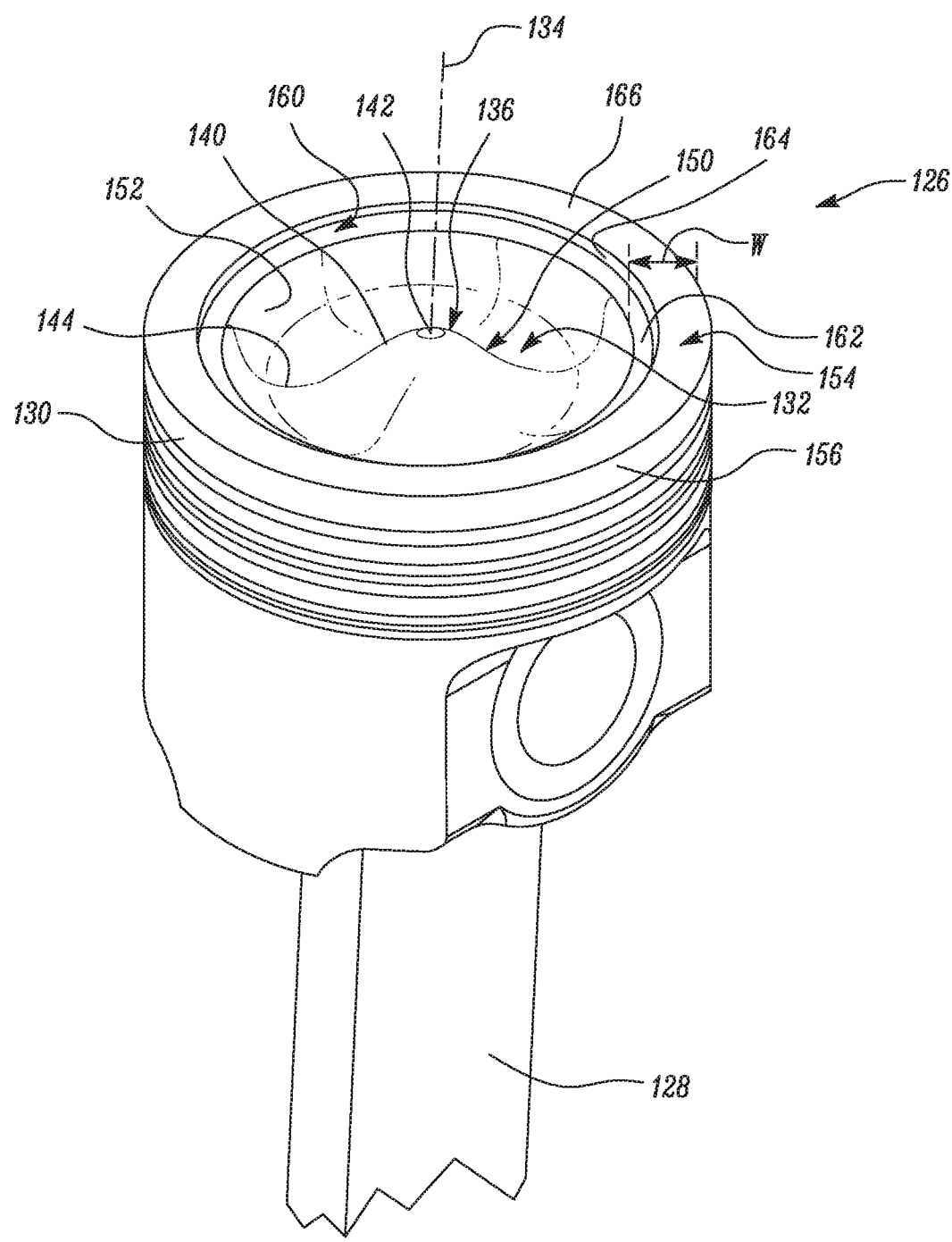
FIG. 5 illustrates a sectional view of the internal combustion engine depicting a single scooped recess along a full circumference of the piston bowl, in accordance with an embodiment of the disclosure.

Further, the controller 200 may control an actuation of the fuel injector 124 to inject the plurality of pilot fuel jets 192 at the pilot injection timing such that the at least one of the plurality of pilot fuel jets 192 is directed towards the scooped recess 160, and contacts the scooped recess 160 (as shown in FIG. 4). In an embodiment, a portion of a plume of at least one of the plurality of pilot fuel jets 192 contacts the scooped recess 160. Alternatively, the entire plume of at least one of the plurality of pilot fuel jets 192 contacts the scooped recess 160. In certain implementations, the pilot injection timing corresponds to a position of the piston 126 between 60 degrees before the top dead center and 35 degrees before the top dead center, during the compression stroke of the internal combustion engine 100.

It may be appreciated, that the main injection timing and the pilot injection timing may be a function of the floor angle 'A' and a spray angle 'B' of the main fuel jets 190 and the pilot fuel jets 192. The spray angle 'B' may be defined as an angle of a fuel jet relative to the central axis 134 of the piston 126. In certain implementations, the spray angle 'B' may be in a range of 60 degrees to 75 degrees.

INDUSTRIAL APPLICABILITY

Figure 6:
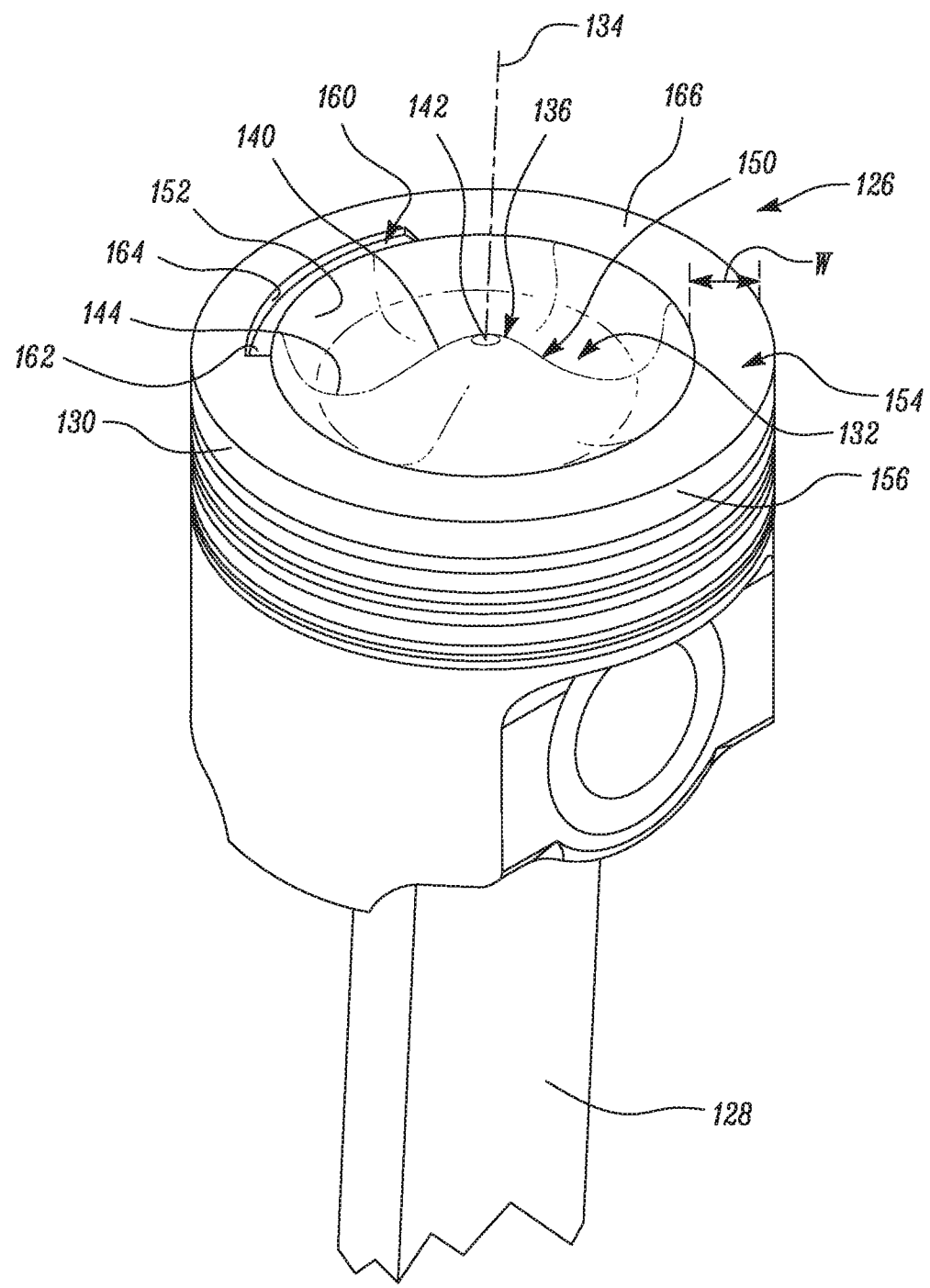
FIG. 6 illustrates a sectional view of the internal combustion engine depicting a scooped recess along a part of the circumference of the piston bowl, in accordance with an embodiment of the disclosure.
Figure 7:
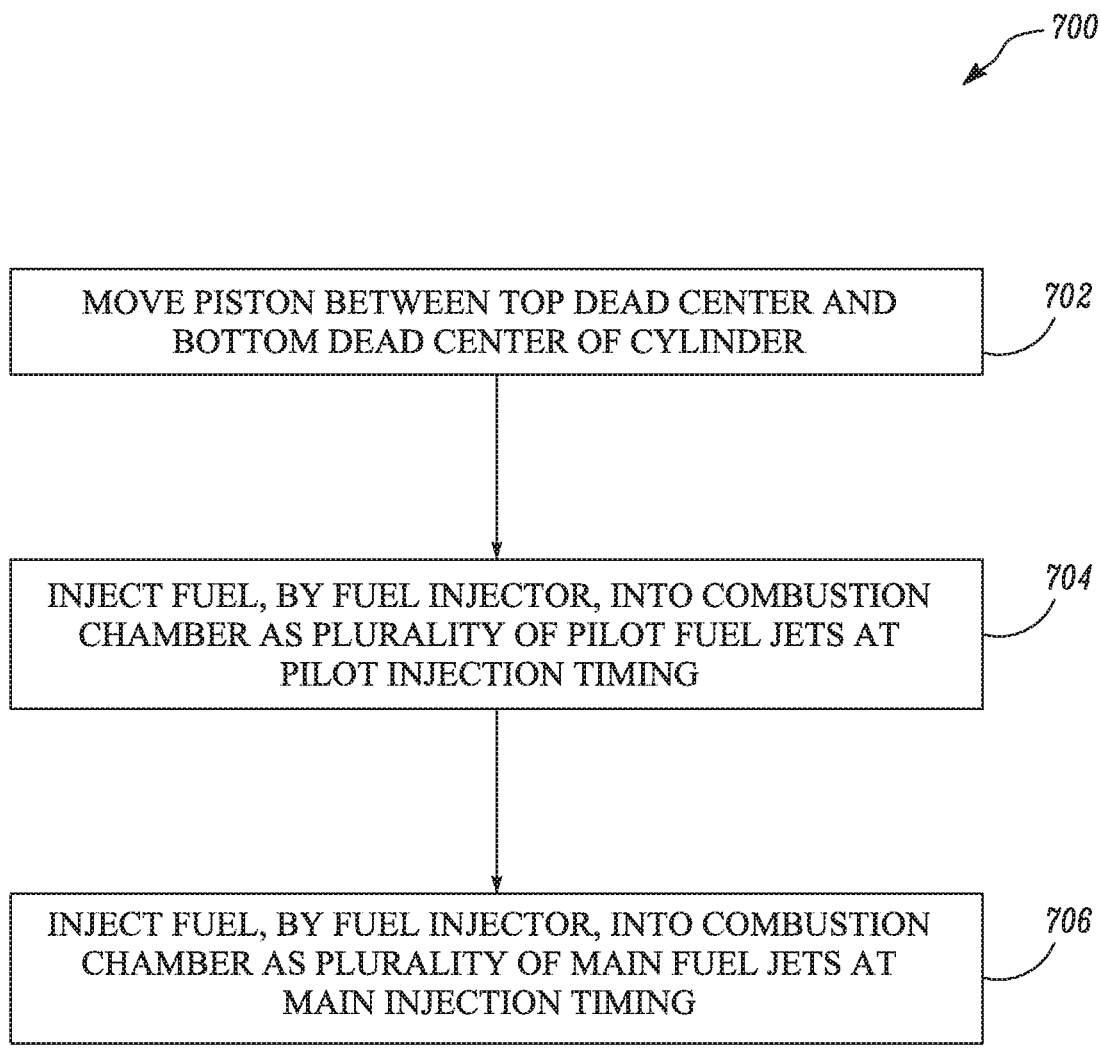
FIG. 7 illustrates a method for operating the combustion system, in accordance with an embodiment of the disclosure.

Referring to FIG. 7, an exemplary method 700 for operating the combustion system 102 for the internal combustion engine 100 is discussed. The method 700 is described by way of a number of steps. The steps are described in conjunction with FIGS. 1-6. The method 700 starts at step 702.

At step 702, during an operation of the internal combustion engine 100, the piston 126 may move between the TDC and the BDC of the cylinder 104. For example, the piston 126 may first execute an intake stroke (i.e. a travel towards the BDC from TDC) to let in the air through the intake conduit 118. Thereafter, the piston 126 may execute a compression stroke (i.e. a travel towards the TDC from the BDC). After the completion of the compression stroke, the piston 126 may execute an expansion stroke and then an exhaust stroke, and then return and again start the intake stroke, to follow a conventional work cycle pattern. Further, it may be appreciated that in certain embodiments, for example a two stroke engine, the intake stroke and expansion stroke is performed together in a single stroke and may be referred as intake stroke, and the exhaust stroke and the compression stroke is performed in a single stroke and may be referred as the compression stroke. It may be noted that one or more aspects of the present disclosure are focused towards the compression stroke and the expansion stroke of the piston 126.

The forthcoming description includes a description of two steps, namely a step 704 and a step 706, that may occur subsequent to the step 702 discussed above. Step 704 relates to the pilot fuel injection event in the combustion chamber 120, while step 706 relates to the main fuel injection event in the combustion chamber 120. It may be noted that the step 704, relating to the pilot fuel injection event, may be omitted in certain scenarios, and step 706 may solely be executed. In an embodiment, when both the main injection event and the pilot injection occurs, it may be appreciated that the step 704 occurs before the step 706. Step 704 will be discussed first.

At step 704, as the piston 126 moves towards the TDC during a compression stroke, the pilot injection event is initiated. The pilot injection timing corresponds to a position of the piston 126 between 60 degrees before the TDC and 35 degrees before the TDC. At such a position of the piston 126, the controller 200 directs the fuel injector 124 to inject fuel into the combustion chamber 120 as the plurality of pilot fuel jets 192. In so doing, each of the plurality of pilot fuel jets 192, substantially entirely, is directed towards the scooped recess 160 and contacts the scooped recess 160. The pilot fuel jets 192 may be deflected and/or dispersed within the combustion chamber 120 after contacting the bottom portion 162 and the sidewall portion 164. Such a deflection and/or dispersion of the pilot fuel jets 192 may follow a profile of the scooped recess 160. As, the pilot fuel jets 192 directly contact the scooped recess 160, an impingement of the pilot fuel jets 192 with the cylinder wall 105 may be prevented, thereby improving engine emissions and durability.

Further, the presence of scooped recess 160 may enable the pilot fuel jets 192 to interact with more air available within the combustion chamber 120, such as air present above the top surface 166 of the piston head 130, enabling more effective combustion. Further, the controller 200 may control an end timing of the pilot fuel injection event so as to prevent the pilot fuel jets 192 from contacting a region of the piston 126 other than the scooped recess 160. The controller 200 may also control the end timing of the pilot fuel injection event so as to prevent the pilot fuel jets 192 from contacting or being deflected towards the cylinder wall 105. In an example, the end of the pilot injection event corresponds to a position of the piston 126 that is 35 degrees before the TDC.

At step 706, as the piston 126 further moves towards the TDC during the compression stroke, the main injection event is initiated. The main injection timing (i.e. a start of a main injection timing) corresponds to a position of the piston 126 between 15 degrees before the TDC and 5 degrees after the TDC. At such a position of the piston 126, the controller 200 directs the fuel injector 124 to inject fuel into the combustion chamber 120 as the plurality of main fuel jets 190 at the main injection timing. In so doing, each fuel jet 190, substantially entirely, contacts the floor portion 150 of the piston bowl 132 and is deflected to follow a profile of the piston bowl 132.

In one exemplary operational scenario, a portion of one of the main fuel jets 190 may first contact the surface 140 and a remaining portion may contact the base 144. In another scenario, an entire width of the main fuel jet 190 may contact the surface 140. Because there exists a smooth, tangential surface continuity from the surface 140 to the base 144, the main fuel jets 190 may then move towards the base 144 and follow of a profile of the base 144. Thereafter, and owing to a continued surface continuity between the base 144 and the rim portion 152, the main fuel jets 190 may transition to the rim portion 152 from the base 144. The main fuel jets 190 may follow a profile of the rim portion 152 and exit the rim portion 152, substantially entirely to come into contact with the first filleted edge 170, defined between the rim portion 152 and the bottom portion 162.

Thereafter, the at least one of main fuel jets 190 follows a curvature of the first filleted edge 170, and moves into the scooped recess 160. A further movement of the at least one of the main fuel jets 190 is defined along a profile of the scooped recess 160. More particularly, the at least one of the main fuel jets 190 substantially entirely further flow along a profile defined by the bottom portion 162 of the scooped recess 160, and then meet the second filleted edge 172. A curvature of the second filleted edge urges the received main fuel jets 190 to substantially entirely be deflected along the sidewall portion 164, directing the main fuel jets 190 away from cylinder wall 105. In certain implementations, the sidewall portion 164 may deflect and direct the main fuel jets in an upward direction, towards the flame deck surface 180 of the cylinder head 106. In an embodiment, each main fuel jet 190 may move into the scooped recess 160 that extends along the full circumference of the piston bowl 132. In certain other implementations, as shown in FIG. 6, when the scooped recess 160 extend along a part of the circumference of the piston bowl 132, only those main fuel jets 190 that are directed towards the scooped recess 160 may move into and follow the profile of the scooped recess 160.

In effect, the scooped recess 160 deflects substantially entirely the main fuel jets 190, exiting the scooped recess 160, away from the cylinder wall 105 and towards the cylinder head 106. As, the main fuel jets 190 are deflected away from the cylinder wall 105, an impingement of the fuel with the cylinder wall 105 is reduced or completely avoided, thereby reducing soot and/or unburned hydrocarbons emissions from the internal combustion engine 100. Further, the scooped recess 160 enables a movement of the main fuel jets 190 farther from the central axis 134 towards the cylinder wall 105, without allowing the main fuel jets 190 to contact the cylinder wall 105. This ensures improved air-fuel mixing and air utilization present above the top surface 166 of the piston head 130. Further, in some embodiments, the controller 200 may control an end timing of the main fuel injection event so as to prevent the main fuel jets 190 from contacting a region of the piston bowl 132 other than the floor portion 150. Alternatively, the controller 200 may control an end timing of the main fuel injection event so as to prevent the main fuel jets 190 from passing over a top of the scooped recess 160. In an example, the end of the main injection event corresponds to a position of the piston 126 that is 30 degrees after the TDC.

In an implementation, the controller 200 may control the fuel injector 124 to enable a post fuel injection event. The post fuel injection event refers to an injection of fuel as a plurality of post fuel jets into the combustion chamber 120 after the main injection event, and when the piston 126 has completed the compression stroke and is moving from the TDC to the BDC. The controller 200 may inject the post fuel jets at a post injection timing such that the entire plume or at least a portion of the plume of the at least one of the post fuels jet is directed towards the scooped recess 160 and contact the scooped recess 160. The controller 200 may determine the post injection timing based on the floor angle 'A' and a spray angle of the fuel jets. Thus, the controller 200 controls the post injection timing to ensure that the contact of post fuel jets with the cylinder wall 105 is reduced or completely avoided. This helps in reducing soot or hydrocarbon emissions from the internal combustion engine 100. Further, this also improves mixing of fuel with the air present in the combustion chamber 120, particularly enabling utilization and mixing of the air present above the top surface 166 of the piston 126.

The presence of the scooped recess 160 may enable 1-5 degrees advance on start of the pilot injection event and 1-5 degrees retard of an end of the main injection event relative to a main fuel injection event and pilot fuel injection event for a combustion system without the scooped recess 160. Therefore, the scooped recess 160 coupled with the fuel injection timings help in preventing or minimizing impingement of the fuel with the cylinder wall 105—thereby reducing emissions from the internal combustion engine 100.

Further, the scooped recess 160 coupled with a fuel injection timing also enables improved air utilization and air fuel mixing as explained earlier.

What is claimed is:

1. A combustion system for an internal combustion engine, the combustion system comprising:
    a cylinder having a cylinder wall defining a bore;
    a piston disposed inside the bore and configured to reciprocate between a top dead center position and a bottom dead center position along a longitudinal direction of the cylinder wall, the piston including a piston bowl and at least one scooped recess extending radially outwardly from a periphery of the piston bowl, the at least one scooped recess being separate from the piston bowl, the piston bowl defining a floor portion;
    a combustion chamber delimited by a cylinder head, the cylinder wall, and the piston;
    a fuel injector disposed in fluid communication with the combustion chamber and configured to inject a plurality of fuel jets into the combustion chamber; and
    a controller operatively coupled to the fuel injector, the controller being configured to
        effect a pilot injection mode of the fuel injector, the pilot injection mode causing each fuel jet from the plurality of fuel jets to impinge directly upon the at least one scooped recess and to impinge directly upon the piston entirely outside the piston bowl along a radial direction, the radial direction being perpendicular to the longitudinal direction of the cylinder wall, and
        effect a main injection mode of the fuel injector, the main injection mode of the fuel injector causing each fuel jet of the plurality of fuel jets to impinge directly upon the piston bowl,
    wherein the at least one scooped recess includes a bottom portion and a sidewall portion, and
    wherein the bottom portion has a length along the radial direction that is in a range of 25% to 75% of a width of a crown portion of the piston.

2. The combustion system of claim 1, wherein the piston bowl includes a rim portion, wherein the at least one scooped recess defines a first filleted edge with the rim portion, a radius of the first filleted edge is in a range of 10% to 30% of a width of a crown portion of the piston.

3. The combustion system of claim 1, wherein the sidewall portion has a depth, along the longitudinal direction of the cylinder wall, in a range of 1% to 3% of a diameter of the bore.

4. The combustion system of claim 3, wherein the at least one scooped recess includes a second filleted edge defined between the bottom portion and the sidewall portion, a radius of the second filleted edge is in a range of 1% to 3% of the diameter of the bore.

5. The combustion system of claim 1, wherein a timing of the main injection mode corresponds to a position of the piston between 15 degrees before the top dead center and 5 degrees after the top dead center.

6. The combustion system of claim 1, wherein each fuel jet extends from the fuel injector at a spray angle relative to a central axis of the piston in a range of 60 degrees to 75 degrees.

7. The combustion system of claim 1, wherein the floor portion includes a floor angle relative to a central axis of the piston in a range of 55 degrees to 80 degrees.

8. The combustion system of claim 1, wherein the at least one scooped recess is a single scooped recess extending about a full circumference of the piston bowl.

9. The combustion system of claim 1, wherein the at least one scooped recess extends only partially about a circumference of the piston bowl.

10. A combustion system for an internal combustion engine, the combustion system comprising:
   a cylinder having a cylinder wall defining a bore;
   a piston disposed inside the bore and configured to reciprocate between a top dead center position and a bottom dead center position along a longitudinal direction of the cylinder wall, the piston including a piston bowl and at least one scooped recess extending radially outwardly from a periphery of the piston bowl, the at least one scooped recess being separate from the piston bowl, the piston bowl defining a floor portion;
   a combustion chamber delimited by a cylinder head, the cylinder wall, and the piston;
   a fuel injector disposed in fluid communication with the combustion chamber and configured to inject fuel into the combustion chamber as a plurality of main fuel jets and a plurality of pilot fuel jets; and
   a controller operatively coupled to the fuel injector, the controller being configured to
      cause each pilot fuel jet of the plurality of pilot fuel jets to impinge directly upon the at least one scooped recess and to impinge directly upon the piston entirely outside the piston bowl along a radial direction, the radial direction being perpendicular to the longitudinal direction of the cylinder wall, and
      cause each main fuel jet of the plurality of main jets to impinge directly upon the piston bowl,
   wherein the at least one scooped recess includes a bottom portion and a sidewall portion, and
   wherein the bottom portion has a length along the radial direction that is in a range of 25% to 75% of a width of a crown portion of the piston.

11. The combustion system of claim 10, wherein the piston bowl includes a rim portion, wherein the at least one scooped recess defines a first filleted edge with the rim portion, a radius of the first filleted edge is in a range 10% to 30% of a width of a crown portion of the piston.

12. The combustion system of claim 10, wherein the sidewall portion has a depth, along the longitudinal direction of the cylinder wall, in a range of 1% to 3% of a diameter of the bore.

13. The combustion system of claim 12, wherein the at least one scooped recess includes a second filleted edge defined between the bottom portion and the sidewall portion, a radius of the second filleted edge is in a range of 1% to 3% of the diameter of the bore.

14. The combustion system of claim 10, wherein a timing of the plurality of main fuel jets corresponds to a position of the piston between 15 degrees before the top dead center and 5 degrees after the top dead center.

15. The combustion system of claim 10, wherein a timing of the plurality of pilot fuel jets corresponds to a position of the piston between 60 degrees before the top dead center and 35 degrees before the top dead center.

16. The combustion system of claim 10, wherein each main fuel jet and each pilot fuel jet extends from the fuel injector at a spray angle relative to a central axis of the piston in a range of 60 degrees to 75 degrees.

17. The combustion system of claim 10, wherein the floor portion includes a floor angle relative to a central axis of the piston in a range of 55 degrees to 80 degrees.

18. The combustion system of claim 10, wherein the at least one scooped recess is a single scooped recess extending about a full circumference of the piston bowl.

19. The combustion system of claim 10, wherein the at least one scooped recess extends only partially about a circumference of the piston bowl.

20. A method for operating a combustion system for an internal combustion engine, the method comprising:
   moving a piston between a top dead center position and a bottom dead center position along a longitudinal direction of a cylinder, the piston including a piston bowl and at least one scooped recess extending radially outwardly from a periphery of the piston bowl, the at least one scooped recess being separate from the piston bowl, the piston bowl defining a floor portion;
   injecting a plurality of pilot fuel jets into a combustion chamber of the internal combustion engine, via a fuel injector, at a pilot injection timing such that each pilot fuel jet of the plurality of pilot fuel jets impinges directly upon the at least one scooped recess and impinges directly upon the piston entirely outside the piston bowl along a radial direction, the radial direction being perpendicular to the longitudinal direction of the cylinder; and
   injecting a plurality of main fuel jets into the combustion chamber, via the fuel injector, at a main injection timing such that each main fuel jet of the plurality of main fuel jets impinges directly upon the piston bowl,
   wherein the at least one scooped recess includes a bottom portion and a sidewall portion, and
   wherein the bottom portion has a length along the radial direction that is in a range of 25% to 75% of a width of a crown portion of the piston.

* * * * *